(12) United States Patent
Chaaya

(10) Patent No.: US 10,421,397 B2
(45) Date of Patent: Sep. 24, 2019

(54) FORWARD MANEUVERING ASSISTANCE USING HEAD-UP DISPLAY

(71) Applicant: VISTEON GLOBAL TECHNOLOGIES, INC., Van Buren Township, MI (US)

(72) Inventor: Elie Abi Chaaya, Jouy le Moutier (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/675,222

(22) Filed: Aug. 11, 2017

(65) Prior Publication Data

US 2019/0047472 A1    Feb. 14, 2019

(51) Int. Cl.
| | | |
|---|---|---|
| *B60Q 9/00* | (2006.01) | |
| *G01S 13/72* | (2006.01) | |
| *B60R 1/00* | (2006.01) | |
| *G01S 13/93* | (2006.01) | |
| *G06K 9/00* | (2006.01) | |
| *G01S 7/04* | (2006.01) | |

(52) U.S. Cl.
CPC ............ *B60Q 9/004* (2013.01); *B60Q 9/007* (2013.01); *B60R 1/00* (2013.01); *G01S 7/04* (2013.01); *G01S 13/72* (2013.01); *G01S 13/931* (2013.01); *G06K 9/00798* (2013.01); *B60R 2300/205* (2013.01); *G01S 2013/9314* (2013.01); *G01S 2013/9332* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 9,403,436 B1 | 8/2016 | Yamada | |
| 2014/0266656 A1 | 9/2014 | Ng-Thow-Hing et al. | |
| 2016/0163108 A1* | 6/2016 | Kim | G02B 27/0101 345/633 |
| 2016/0339959 A1* | 11/2016 | Lee | B62D 15/0265 |

* cited by examiner

*Primary Examiner* — Thomas S McCormack
(74) *Attorney, Agent, or Firm* — Quinn IP Law

(57) ABSTRACT

A system is described for providing forward maneuvering information of a vehicle to avoid obstacles that may damage the vehicle. The system includes a microprocessor configured to execute instructions stored on a non-transitory computer readable medium. The microprocessor is coupled to a sensor, a monitoring sensor, and a head-up display (HUD). The sensor receives information of surroundings of the vehicle. The monitoring sensor determines an angle of a steering wheel. The microprocessor receives the information and the angle, determines a guided path for the vehicle based on the information and the angle, and transmits the guided path to the HUD.

20 Claims, 6 Drawing Sheets

FORWARD MANEUVERING ASSISTANCE USING HEAD-UP DISPLAY

BACKGROUND

Vehicles may be equipped with various kinds of driving assistance systems. Such systems may provide assistance, such as a parking assistance system using a display while the vehicle is stationary or moving at an extremely low speed during a parking maneuver. The parking assistance system may be located in a forward portion of the vehicle via a central information display, such as a windshield, rear-view mirror, or center console, such that the driver is looking forward to view the information instead of looking in the direction that the vehicle is moving or projected to move. In this situation, the driver cannot maintain view of the road while using the parking assistance system to park the vehicle.

Another driving assistance system is a warning system that informs the driver or occupant ("driver") of a situation that could be dangerous, such as a collision with another vehicle. Some examples of warning systems that provide information to the occupant are included in back-up assistance systems, lane-assist systems, and blind spot detection systems.

While the above-identified systems provide the occupant with warnings of potential collisions with objects or other vehicles, these systems fail to provide forward maneuvering assistance to occupants. More specifically, these systems fail to provide the occupant with guidance information related to specific conditions, such as narrow roads with obstacles in the occupant's projected path or driving through gates or entering into driveways, in such a way that the occupant may view the guidance information while driving and maintain view of the road. For example, a back-up assistance system provides a warning to the occupant when the vehicle is in reverse and when certain objects are located behind or near a rear portion of the vehicle within a certain proximity to the vehicle. The system does not provide the occupant with forward maneuvering information. Similarly, the blind spot warning system alerts the occupant to objects within a certain proximity to a specific blind spot on the vehicle, but does not provide information of objects or vehicles that may enter into such an area on the vehicle based on the vehicle's forward projected path.

Furthermore, when occupants are operating the vehicle in a forward direction or are turning, occupants often misjudge driving maneuvers or do not notice other vehicles or objects in the vehicle's projected path. This misjudgment may lead to the vehicles colliding into or scraping against other vehicles or objects, causing damage to the vehicles, objects, or other vehicles. A forward maneuvering assistance system with a head-up display (HUD) in the field of view (FOV) of an occupant provides guidance and/or safety information about specific conditions or obstacles, such as gates, walls, adjacent cars, while the occupant is able to maintain view of the road, even at low speeds in narrow lanes or while entering a driveway or passing through a gate. Because the information is displayed in the occupant's FOV, the occupant may react more quickly to the provided information. Forward maneuvering assistance systems increase the occupant's safety by assisting the occupant in avoiding obstacles and damage to the vehicle.

SUMMARY

This section provides a general summary of the present disclosure and is not a comprehensive disclosure of its full scope or all of its features, aspects, and objectives.

Disclosed herein are implementations of a system for providing forward maneuvering information of a vehicle. The system includes a microprocessor configured to execute instructions stored on a non-transitory computer readable medium. The system also includes a sensor, a monitoring sensor, and a head-up display (HUD) coupled to the microprocessor. The sensor is configured to receive information of surroundings of the vehicle. The monitoring sensor is configured to determine an angle of a steering wheel. The microprocessor is further configured to receive the information and the angle, determine a guided path for the vehicle based on the information and the angle, and transmit the guided path to the HUD.

Also disclosed herein are implementations of a method for providing forward maneuvering information of a vehicle. The method includes receiving information of surroundings proximate to a projected path of the vehicle and determining an angle of a steering wheel. The method further includes processing the information of surroundings and the angle to determine a guided path for the vehicle. The method further includes transmitting the guided path for the vehicle to a display.

Also disclosed herein are implementations of an assistance system of a vehicle. The assistance system includes a non-transitory computer readable medium to store instructions of the assistance system. The assistance system also includes a processor configured to execute the instructions. The processor is configured to determine a position of the vehicle relative to surroundings of the vehicle and determine an angle of a steering wheel. The processor is further configured to determine a path for the vehicle and transmit the path to another component of the vehicle.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Generally, this disclosure relates to systems and methods using a display, preferably a head-up display (HUD) or an augmented reality head-up display (AR-HUD) located on a windshield in a field of view of an occupant, such as a driver, to assist the occupant in safely maneuvering a vehicle during difficult maneuvering conditions, such as traveling on narrow roads, entering driveway entrances, passing through gates, or avoiding obstacles, like poles or vehicles, while making turns. This disclosure is not limited to forward maneuvering and may be used in additional implementations or environments, such as with advanced driver-assistance systems (ADAS).

Figure 1:
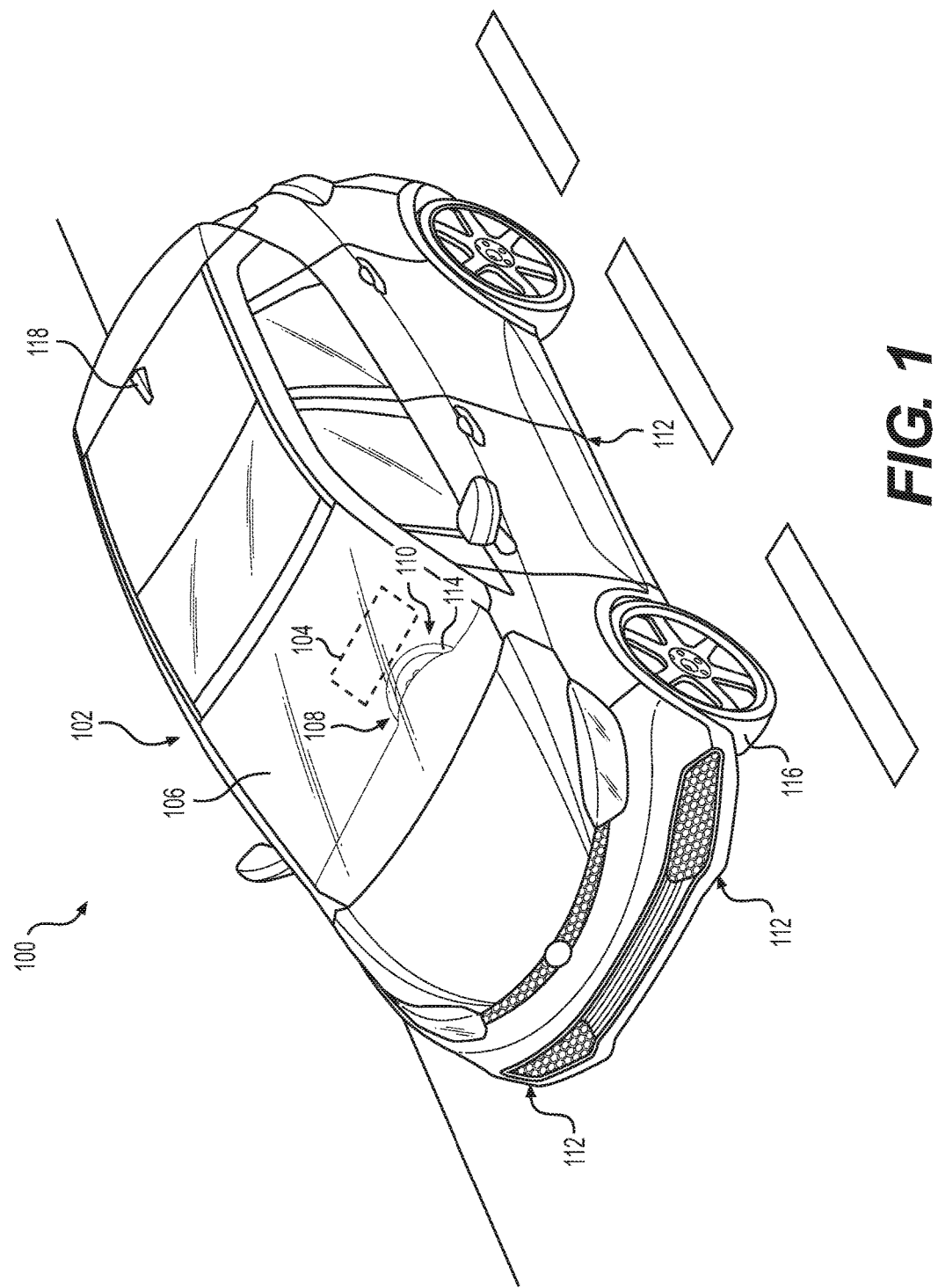
FIG. 1 is an elevated perspective view of a vehicle implementing an exemplary vehicle assistance system used to enhance an occupant's awareness of a surrounding environment and obstacles when the vehicle is turning or moving in a forward direction in accordance with one aspect of the present disclosure.

Referring to FIG. 1, an exemplary vehicle 100 having an assistance system 102 is illustrated. The vehicle 100 is equipped with the assistance system 102 to enhance an occupant's awareness of difficult driving or maneuvering conditions and surrounding obstacles when the vehicle is turning or moving in a forward direction. The assistance system 102 is configured to project a virtual or an actual location of an object, such as a potential obstacle, as well as surroundings of the vehicle 100 using a display 104. The display 104 may include at least one of a HUD, an AR-HUD, a projector, or another type of display system. The display 104 may show three-dimensional images, content, or graphics, such as three-dimensional objects on a ground plane. The display 104 may employ lenses to magnify the data of the surrounding environment of the vehicle 100, and illustrate the magnified data on the display 104. The display 104 is intended to focus the occupant's attention in the occupant's FOV, while providing the occupant with safety information, so that the occupant is able to maintain view of the road. Preferably, the display 104 is projected onto a windshield 106 within the occupant's FOV on the windshield 106 while the occupant is maneuvering the vehicle 100. The assistance system 102 may position the display 104 at an alternative location, such as at another position on the windshield 106, a rear-view mirror, a console display, an instrument panel, or projected in such a way that the display appears to be outside of the vehicle 100.

A monitoring sensor 108 is coupled to the vehicle 100, preferably to a steering wheel system 110. For example, the monitoring sensor 108 may be coupled to a steering wheel 114, a steering column, a rack and pinion, another part of the steering wheel system 110. The monitoring sensor 108 may also be incorporated into a system, such as an electric power steering system. The monitoring sensor 108 is a sensor that is configured to capture vehicle data or data representing a steering angle of the vehicle 100, such as an angle that the steering wheel 114 is positioned or orientated. The angle of the vehicle 100 or the angle of the steering wheel 114 may be measured through a number of different systems and is not limited to any system shown. The monitoring sensor 108 is further configured to transmit the captured data to the assistance system 102. In another embodiment, the monitoring sensor 108 is configured to capture data of an angle of a tire 116 on the vehicle 100. A Global Positioning Satellite (GPS) or GPS unit 118 may be coupled to the vehicle 100 and configured capture data on the position of the vehicle 100 and transmit the data to the assistance system 102. The assistance system 102 may determine or calculate the angle of the steering wheel 114 based on the position of the vehicle 100. The assistance system 102 may be configured not to process the data captured or display the processed data unless the vehicle 100 is making a turn, moving forward, or in a specific maneuvering condition.

The assistance system 102 includes one or more sensors 112, The sensor 112 may be coupled to an exterior of the vehicle 100, preferably positioned around the perimeter of the vehicle 100. The sensor 112 may include a camera, image sensing device, sonar, radar, LIDAR, or GPS. The sensor 112 is configured to capture data of the environment surrounding the vehicle 100 and objects, such as obstacles, in a projected path of the vehicle. The sensor 112 transmits the captured data to the assistance system 102.

Figure 2:
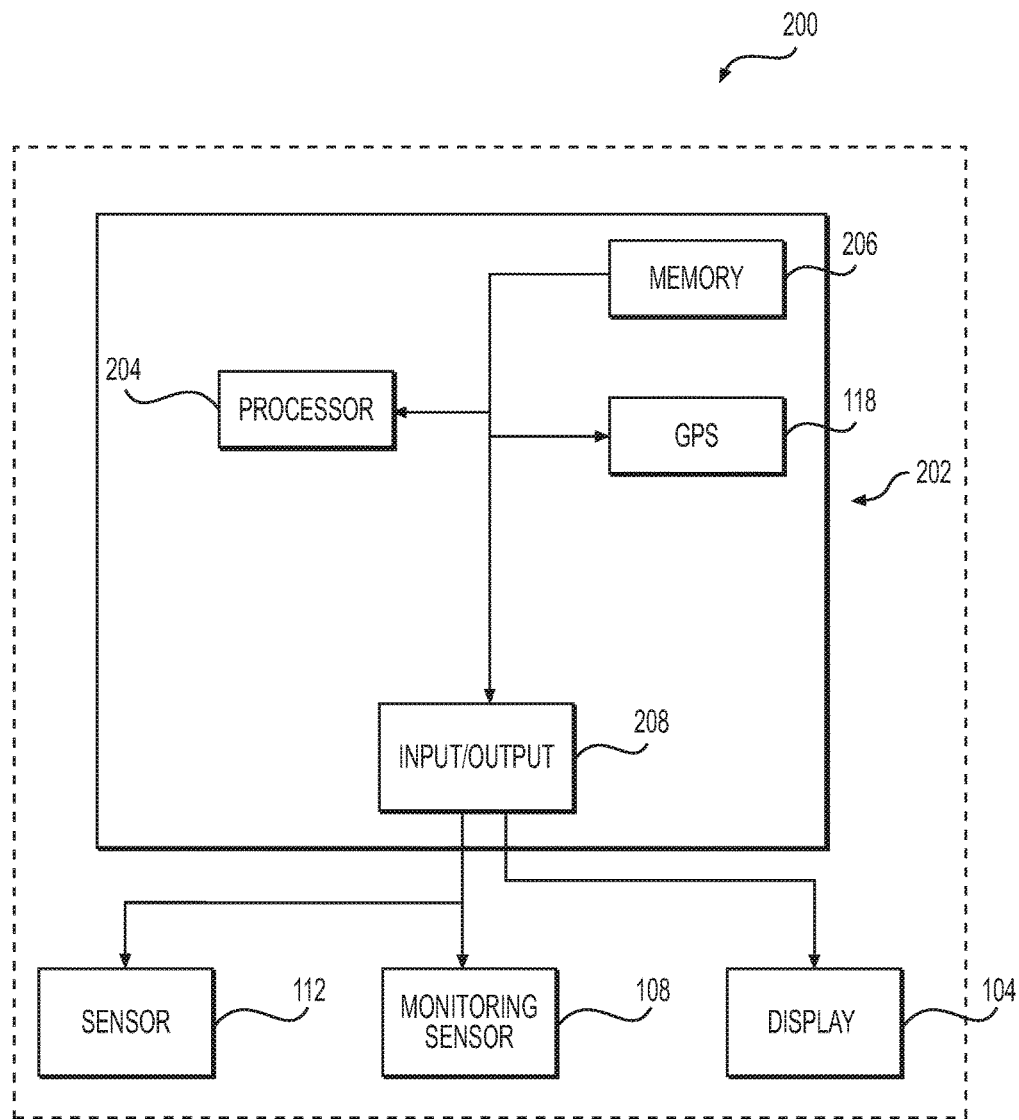
FIG. 2 is a simplified block diagram depicting exemplary components of the assistance system in accordance with one aspect of the present disclosure.

FIG. 2 is an illustrative block diagram depicting exemplary components of the assistance system 102 in accordance with one aspect of the present disclosure. The assistance system 102 may include additional and/or fewer components and is not limited to those illustrated in FIG. 2. The assistance system 102 includes a system 200 having a control unit 202. The control unit 202 includes various components such as at least one microprocessor or processor 204, a memory 206, a GPS unit 118, and an input/output 208. The control unit 202 may process the data captured by the sensor 112 to identify the environment surrounding the vehicle 100. The control unit 202 may process a position of an object within that environment. The control unit 202 processes data and generates a graphical representation of the environment and any objects captured by the sensors 112. The control unit 202 also processes data generated by the monitoring sensor 108 of the vehicle 100. The control unit 202 receives data from the monitoring sensor 108 in order to determine if the vehicle 100 is traveling in a forward direction or making a turn. More specifically, the data may include an angle of the steering wheel 114. The data may include the speed of rotation of the steering wheel 114. If the control unit 202 determines that the vehicle 100 is traveling forward or turning and there is a specific maneuvering condition or an obstacle in the projected path of the vehicle 100, the control unit 202 may generate a graphical representation indicating a guided path for the vehicle 100. The control unit 202 may also generate an indicator and/or a guidance alert, or alert, which will be discussed further in FIG. 3.

The assistance system 102 is a dynamic system. Thus, the control unit 202 may continuously update graphical representations of the environment and the objects captured by the sensor 112 as the vehicle 100 is traveling. Graphical representations indicating the projected path of vehicle 100 or the guided path for the vehicle 100 may also be continuously updated as the position of the vehicle 100 changes.

The processor 204 is a device that processes signals and performs general computing and arithmetic functions. The processor 204 may include multiple single and multicore processors, co-processors, and architectures. The memory 206 may include a variety of memory, such as volatile memory and non-volatile memory. The memory 206 may also include a disk, such as but not limited to a flash memory card, a memory stick, a magnetic disk drive, a solid state disk drive, a CR-ROM, or a DVD ROM. The memory 206 may store a system that controls resources of a computing device and software that the processor 204 executes. The processor 204 and memory 206 are operatively coupled. The processor 204 performs processes by executing software instructions stored by the memory 206. The processes may include capturing data of the environment surrounding the vehicle 100, including obstacles. The processes may also include determining the angle of the steering wheel 114. The processes may further include calculating a projected path and/or a guided path for the vehicle 100. The processes may also include displaying one of the projected path or the guided path. The processes may further include displaying the indicator representing the obstacle and/or an alert notification or alert to guide the occupant in maneuvering the vehicle 100 safely and/or avoiding the obstacle.

The processor 204, the memory 206, the GPS unit 118, communicate through the input/output 208. The GPS unit 118 may be part of the system 200 or part of a separate system. The input/output 208 is a part of the system 200 and communicates with the sensor 112, the monitoring sensor 108, and the display 104. The data captured by the sensor 112 and the monitoring sensor 108 is input to processor 204 for processing and output to the display 104 for providing forward maneuvering assistance to the occupant of the vehicle 100. More specifically, the assistance system 102 may show a graphical representation of the data captured along with the projected path of the vehicle 100, or a guided path determined or calculated based on the data captured from one or more monitoring sensors 108 to detect a steering angle of the vehicle 100 and one or more sensors 112 to capture information of the environment surrounding the vehicle 100 that is processed by the processor 204 and displayed on the display 104.

Figure 3:
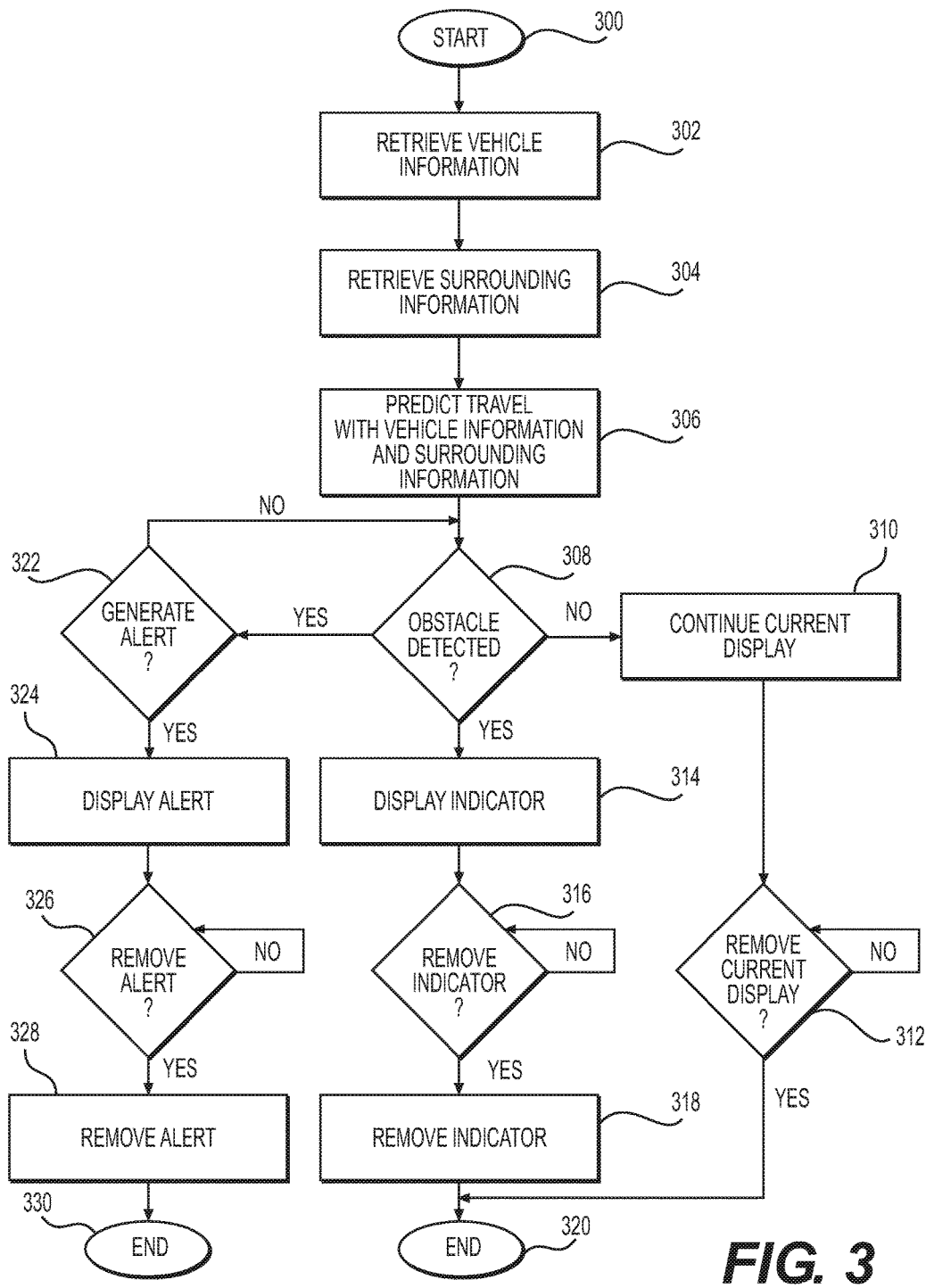
FIG. 3 is a flow chart illustrating an exemplary process for displaying one of a projected path or a guided path for the vehicle in accordance with one aspect of the present disclosure.

FIG. 3 is a flow chart illustrating an exemplary process for displaying one of a projected path or a guided path for the vehicle in accordance with one aspect of the present disclosure. The assistance system 102 may include additional and/or fewer steps or processes and is not limited to those illustrated in FIG. 3. In one embodiment, a non-transitory computer readable medium stores instructions of the assistance system and the processor 204 is configured to execute the instructions. Once the processor 204 begins to execute the instructions, the process proceeds from step 300 to step 302.

At step 302, the assistance system 102 retrieves vehicle information, such as steering directions or the angle in which the steering wheel 114 is oriented. The monitoring sensor 108 is coupled to the vehicle 100, preferably to the steering wheel system 110. The monitoring sensor 108 is configured to determine the angle of the steering wheel 114. More specifically, the monitoring sensor 108 retrieves vehicle data and transmits the vehicle data to the control unit 202 for processing by the processor 204. Alternatively, a GPS unit 118 may be used to provide steering direction information for the processor 204 to determine or calculate the angle of the steering wheel 114.

At step 304, the assistance system 102 retrieves data of the information of surroundings, or information proximate to a projected path of the vehicle 100, such as for the environment, objects, and obstacles. As described previously, a sensor 112, for example, a camera, LIDAR, radar, or sonar, or other detection-based systems is used to capture such data. The sensor 112 receives the information and transmits the information to the control unit 202 for processing by the processor 204. The assistance system 102, at step 306, predicts travel based on the vehicle information and the surrounding information. For example, the assistance system 102 determines or calculates a projected path for the vehicle 100 based on the position of the vehicle relative to surroundings of the vehicle, including any obstacles, and the angle of a steering wheel 114. The assistance system 102 may transmit the information proximate to the projected path of the vehicle 100 to the display 104. The display 104 is preferably within the FOV of the occupant. The processor 204 may process the information and the angle of the steering wheel 114 to determine or calculate a guided path for the vehicle. The assistance system 102 may display the guided path of the vehicle 100 and the vehicle surroundings within the FOV of the occupant. The assistance system 102 may display either the projected path or the guided path, together with the vehicle surroundings on a windshield 106 of the vehicle 100.

At decision step 308, the assistance system 102 determines whether there is an obstacle detected from the sensor 112. An obstacle is an object, such as a gate, pole, barrier, vehicle, or object that is located near or within the projected path of the vehicle 100. The assistance system 102 displays a graphical representation of some of the environment that surrounds the vehicle 100. The assistance system 102 may display imaginary lines extending from opposing side portions of the vehicle 100. The vehicle 100 may travel within the imaginary lines, or graphical representations of the projected path. The assistance system 102 may display the obstacle in a variety of shapes, such as a box or a rectangle, to represent the shape or movement of the vehicle 100. The sensor 112 receives information, or data, of an object and transmits the data to the processor 204. The processor 204 determines if the object is an obstacle. The processor 204 may determine that the object is not an obstacle if the object is not proximate to the projected path of the vehicle. The processor 204 may also determine that the object is not an obstacle if the object is not within a predetermined range of the projected path. If the processor 204 does not detect an obstacle, the process proceeds to step 310.

At step 310, the assistance system 202 displays the current display on display 106, such as a projected path of the vehicle 100. At decision step 312, the assistance system 102 determines whether to continue displaying the current display. The display 104 continues displaying the current display until the assistance system 102 determines to stop displaying the current display. When the assistance system 102 determines to stop displaying the current display, the display is turned off. The process proceeds to step 320 and ends. The assistance system 102 may stop displaying the current display after a certain period of time after no obstacle is detected. In another embodiment, the occupant or another user may turn off or adjust the display 104.

Referring back to decision step 308, the processor 204 determines whether there is an obstacle. If the processor 204 determines that an obstacle is present, the process proceeds to step 314 and decision step 322. At step 314, an indicator is displayed. The indicator represents an obstacle proximate to the projected path of the vehicle 100. The indicator may be a graphical representation of the obstacle or a shape similar to the size of a virtual image of the obstacle. The indicator may include various features, such as intensity, brightness, color, shape, size, orientation, or visibility, which may change as the vehicle 100 is approaching the obstacle or the obstacle is approaching the vehicle 100. If more than one indicator is displayed, each indicator may display the same or different features. Once the indicator is displayed, the assistance system 102 may use the indicator to guide the occupant. The assistance system 102 may also display a guided path. This will be discussed in further detail in FIGS. 4-6.

At decision step 316, the assistance system 102 determines whether the indicator may be removed. The assistance system 102 may remove the indicator immediately after the obstacle is no longer within a predetermined range from or proximate to the projected path or guided path for the vehicle 100 or after a predetermined amount of time. If the assistance system 102 determines that the indicator should be removed, then the process proceeds to step 318. At step 318, assistance system 102 removes the indicator from the display 104. The process proceeds to step 320 and ends. After the process ends, assistance system 102 may return the conditions back to normal.

Referring back to decision step 308, if the assistance system 102 determines that an obstacle is detected, the process continues at decision step 322. At decision step 322, the assistance system 102 determines whether an alert should be displayed on display 104. If the assistance system 102 determines that an alert should not be displayed, then the process returns to decision step 308 to determine whether an obstacle is detected. If the assistance system 102 determines that an alert should be displayed, then the process proceeds to step 324.

At step 324, the processor 204 is configured to transmit an alert to another component of the vehicle 100 in response to a projected path and an object of the surrounding overlapping. For example, the processor 204 may transmit the alert to the display 104. The processor 204 may display the alert adjacent to the indicator. When the alert is within the guided path, the alert is used to alert the occupant of the obstacle. The alert also may guide the occupant to avoid the obstacle. In other words, the processor 204 transmits the alert to the display 104 to warn or alert the occupant to maneuver the vehicle 100 along the guided path and away from the obstacle. The alert may be a shape, such as an arrow, to represent the direction that the occupant should adjust the vehicle to avoid the obstacle. Preferably, the assistance system 102 transmits the alert within the FOV of the occupant on the windshield 108 so that the occupant is able to maintain view of the road while using the assistance system 102. The alert may also have features to change intensity, brightness, color, shape, size, orientation, or visibility as the vehicle 100 is approaching the obstacle. The assistance system 102 may display more than one alert. The assistance system 102 may display alerts with the same or different features.

Similar to decision step 316, and step 318, the assistance system 102 determines whether to remove the alert at decision block 326. When the assistance system 102 determines that the alert should be removed, the process proceeds to step 328. At step 328, the assistance system 102 removes the alert from the display 104. The process proceeds to step 330 and ends. After the process ends, the assistance system 102 may return conditions back to normal. In one embodiment, the assistance system 102 proceeds to an additional decision step after either steps 318 or 328 to determine whether an indicator or an alert is displayed on display 104. If the assistance system 102 determines that either the indicator or the alert is displayed, the process proceeds back to decision step 308. If the assistance system 102 detects neither the indicator nor the alert being displayed, then the process ends.

Figure 4:
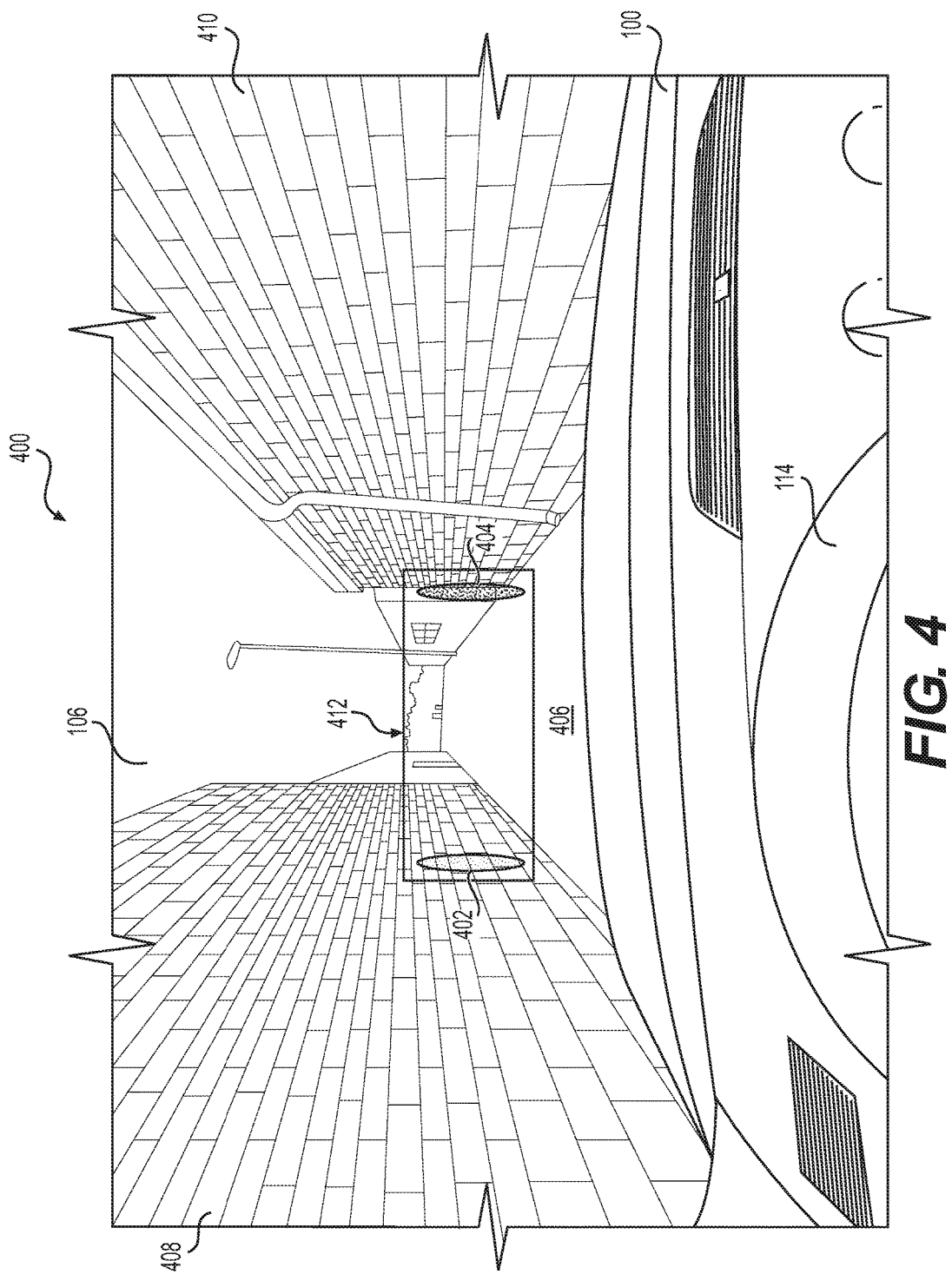
FIG. 4 is an illustrative FOV of an occupant from the vehicle having an exemplary display showing indicators representing obstacles in a path of the vehicle in accordance with one aspect of the present disclosure.

FIG. 4 illustrates an occupant's FOV 400 from the vehicle 100 while traveling through a specific condition having an exemplary display showing indicators 402, 404 representing obstacles in a path of the vehicle 100 in accordance with one aspect of the present disclosure. The vehicle 100 is traveling through the specific condition, such as on a narrow road 406 with walls 408, 410 on either side of the narrow road 406. The sensor 112 receives information of the obstacles proximate to a projected path 412 of the vehicle 100. The assistance system 102 determines that the obstacles are proximate to the projected path 412. The processor 104 generates and transmits the indicators 402, 404 to the display 104. The indicators 402, 404 represent obstacles, e.g., the walls. The display 104 is located in the FOV of the occupant of the vehicle 100. The assistance system 102 may transmit display 104 on the windshield 106 or project the display 104 to appear in front of or behind the windshield 106.

As shown in the projected path 412 by the indicators 402, 404, the vehicle 100 is traveling closer to wall 410 than to wall 408. More specifically, the indicator 402 is a lighter color or shade than the indicator 404. The indicator 402 informs the occupant that the vehicle 100 is at a proper distance from the wall 408. The indicator 402 further informs the occupant that if the vehicle 100 continues along the projected path 412, the vehicle 100 will not come in contact with the wall 408. The indicator 404 informs the occupant that the vehicle 100 is slightly close to the wall 410. The indicator 404 further informs the occupant that if the occupant continues along the projected path 412, the vehicle 100 may come in contact with the wall 410, potentially causing damage to the vehicle 100 and/or the wall 410. If the vehicle travels to the left toward the indicator 402, the indicator 404 may become lighter to indicate to the occupant that the wall is becoming less of an obstacle. The indicator 404 may inform the occupant of a change in the status of the obstacle in a variety of ways, such as changing the color of the indicator 404 from a red color indicating an obstacle to a green color indicating that the wall 410 is no longer an obstacle. The indicator 404 may also change the intensity, brightness, color, shape, size, orientation, or visibility of the indicator 404 as the vehicle approaches or avoids the obstacle. The indicator 404 may also blink at one or more speeds. If the vehicle 100 turns too far, indicator 402 may become activated to indicate that wall 408 is now an obstacle. When the indicators 402, 404 are providing information to the occupant to guide the vehicle, the assistance system 102 may change the projected path 412 to a guided path. When the vehicle 100 is no longer traveling on the narrow road 406, the assistance system 102 may remove the indicator. Additionally, the assistance system 102 may continue to show, fade, or turn off the display 104.

Figure 5:
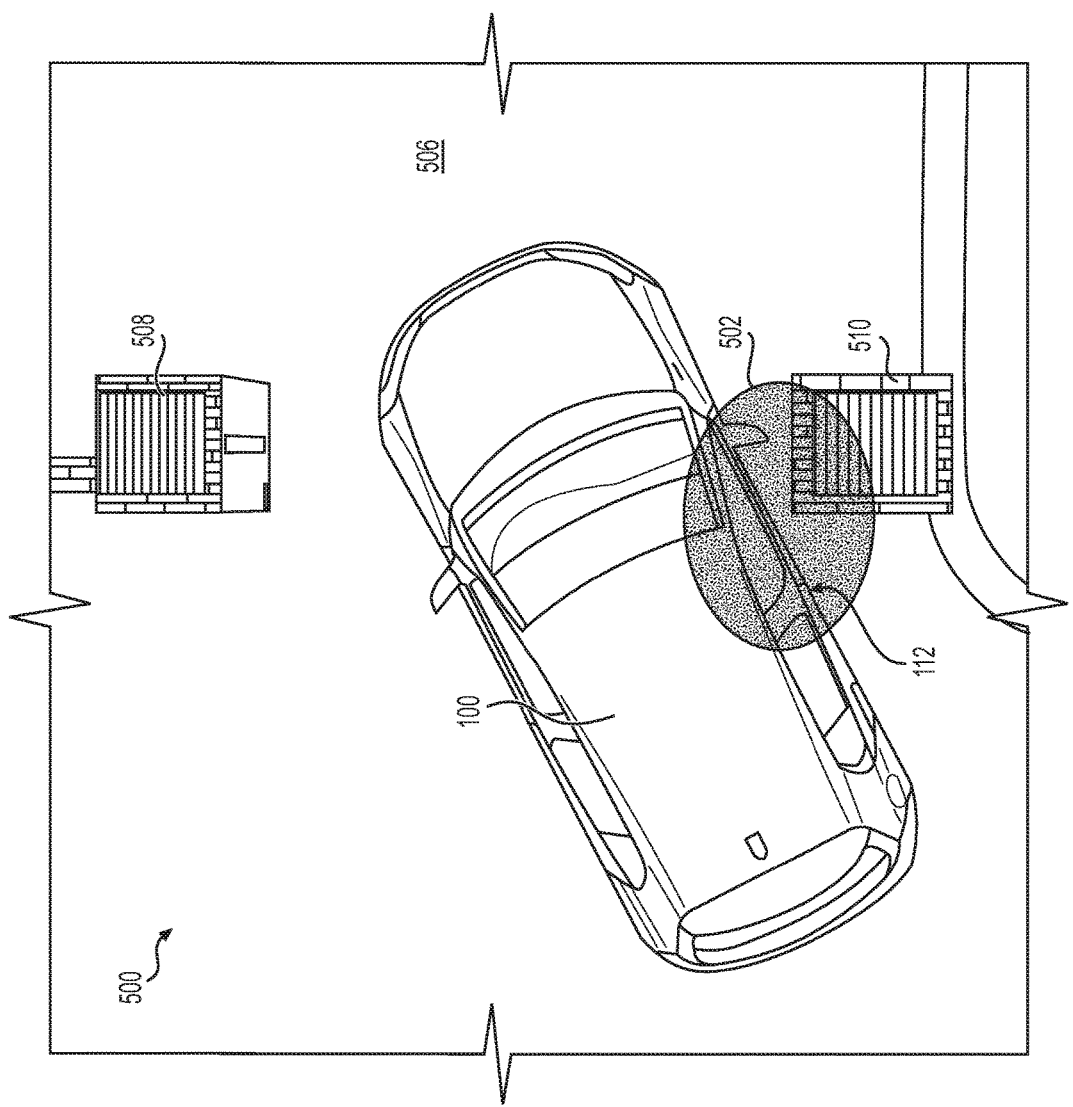
FIG. 5 is a top perspective view showing an exemplary maneuvering condition with an obstacle in a projected path of a vehicle in accordance with one aspect of the present disclosure.
Figure 6:
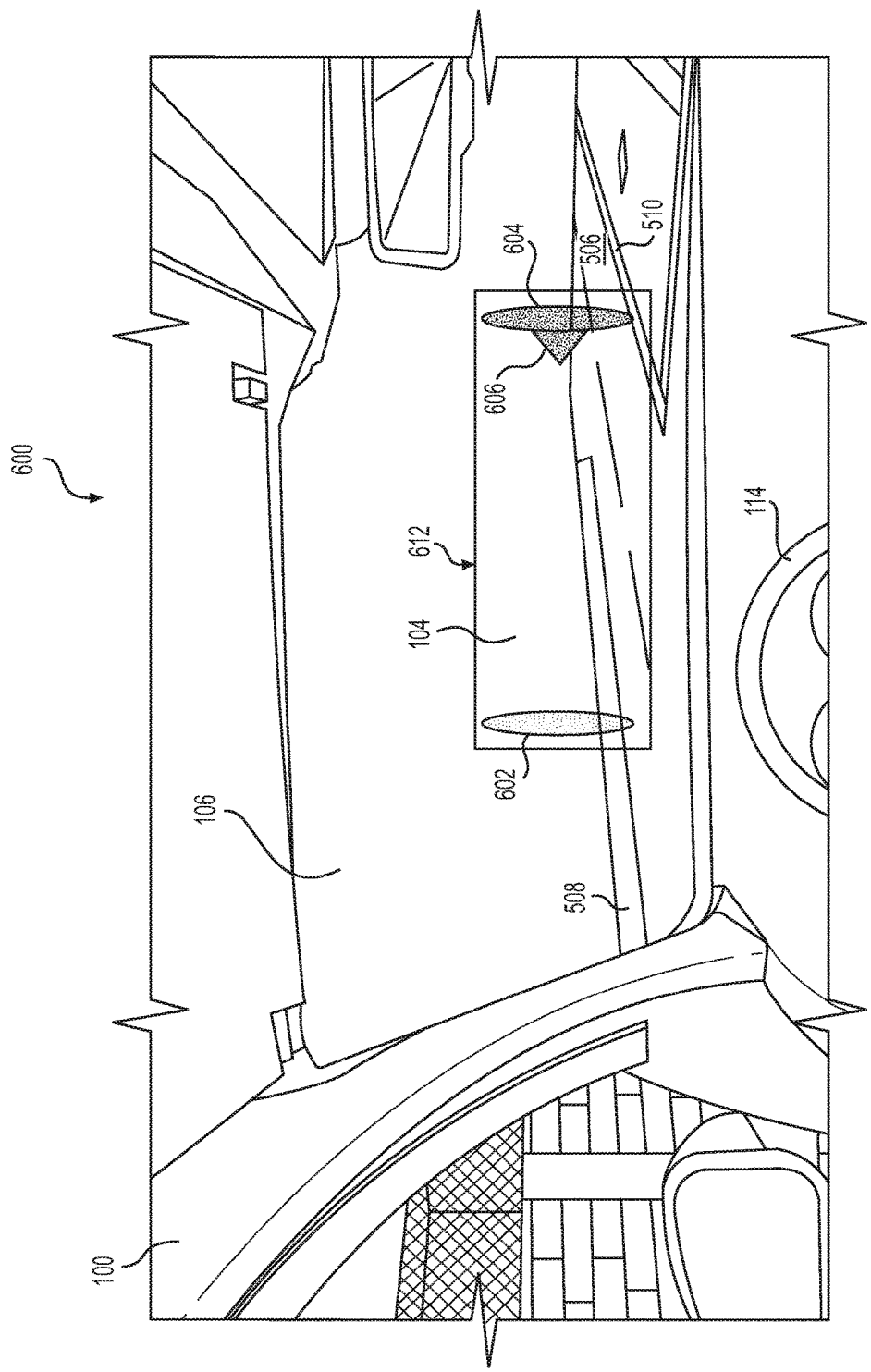
FIG. 6 is an illustrative FOV of the occupant from the vehicle with the maneuvering condition in FIG. 5 showing an exemplary display displaying a guided path with indicators and an alert in accordance with one aspect of the present disclosure.

FIGS. 5 and 6 illustrate a specific condition 500 of a vehicle 100 turning onto a driveway 506 and maneuvering through a gate having posts or barriers 508, 510 with assistance or guidance from the assistance system 102. FIG. 5 illustrates a sensor 112 coupled to a side of the vehicle 100 and configured to receive information of surroundings, or information 502 proximate to a projected path of the vehicle 100. The sensor 112 captures surrounding information, such as the vehicle surroundings 502. The sensor 112 may be a front camera used to capture information, such as the barriers 508, 510. The sensor 112 transmits the information 502 to the control unit 202. The control unit 202, namely, the processor 204 processes the information 502, including the barriers 508, 510. The processor 204 detects an object and determines whether the object is an obstacle, for example, as described in step 308. The assistance system 202 determines the angle of the steering wheel 114 from the monitoring sensor 108. The processor 204 is coupled to the sensor 112 and to the monitoring sensor 108. The processor 204 processes the information 502, and the angle of the steering wheel 114. The processor 204 determines the proximity of the barriers 508, 510 by using the angle of the steering wheel 114 and dimensions of the vehicle 100. The processor 204 then determines a guided path 612 for the vehicle 100 to avoid the barriers 508, 510. The processor 204 transmits the guided path 612 for the vehicle 100 onto the display 104 as shown in FIG. 6.

FIG. 6 illustrates an occupant's FOV 600 from the vehicle with the maneuvering condition in FIG. 5 showing an exemplary display displaying a guided path with indicators and an alert in accordance with one aspect of the present disclosure. The assistance system 102 presents indicators 602, 604, such as augmented reality indicators or markers, onto the display 104. The indicators 602, 604 guide the occupant of the vehicle 100 to maneuver between various obstacles, such as barriers 508, 510, without damaging the vehicle 100. The assistance system 102 may display the indicators 602, 604 as virtual positions of the tire 116. The assistance system 102 may display the indicators 602, 604 that are angled in a projected direction that the vehicle 100 may travel. The display 104 shows the guided path 612, such that the guided path 612 incorporates an augmented virtual display wherein the entirety of a virtual vehicle is within the display 104. In other words, the processor 204 evaluates the entire size of the vehicle, including, for example, side view mirrors, when determining the guided path 612.

In addition to the system and methods as described in FIG. 4, the assistance system 102 presents an alert 606, such as an augmented reality alert or marker, on the display 104. The display 104 is preferably the HUD or the AR-HUD. The alert 606 guides the occupant of a vehicle 100 to maneuver between various obstacles, such as barriers 508, 510, without damaging the vehicle 100. The assistance system 102 may display the alert 606 that is attached to, adjacent to, or in proximity with the indicator 604. The assistance system 102 may display more than one alert 606 at the same time or separate times. The alert 606 may be angled in a projected direction that the vehicle 100 should travel, or be a certain shape, such as an arrow pointing toward the direction of guided travel. Displaying no alert near indicator 602 may inform the occupant that the vehicle 100 is at a proper distance from the barrier 508. In other words, the assistance system 102 informs the occupant that if the vehicle 100 continues along the guided path 612, the vehicle 100 will avoid the barrier 508. The alert 606 may inform the occupant that the vehicle 100 is slightly close to the barrier 510. The vehicle 100 may collide with the barrier 510, causing damage, unless the vehicle is maneuvered about the barrier 510. The alert 606 provides guidance to the occupant to maneuver the vehicle 100 along the guided path 612. In another embodiment, the assistance system 102 automatically guides the vehicle 100 along the guided path 612 to avoid the obstacle 510.

Similar to indicator 604, if the vehicle is steered to the left toward indicator 602, the alert 606 may become lighter to indicate to the occupant that the barrier 510 is becoming less of an obstacle. The alert 606 may inform the occupant of a change in the status of the obstacle in a variety of ways, such as by changing the color of the alert 606 from a red color meaning indicating an obstacle to a green color indicating that the barrier 510 is no longer an obstacle. The alert 606 may also change the intensity, brightness, color, shape, size, orientation, or visibility of the alert 606 as the vehicle approaches or avoids the obstacle. The alert 606 may also blink at one or more speeds or rhythms. If the vehicle 100 turns too far, the assistance system 102 may activate an additional alert to indicate that barrier 508 is now an obstacle. When the alert 606 provides the information to the occupant to guide the vehicle, the assistance system 102 may change the projected path to a guided path 612. When the vehicle 100 is no longer turning onto the driveway 506 and traveling through the gate next too close to barriers 508, 510, the assistance system 102 may remove the alert 606. Additionally, the assistance system 102 may continue to show, fade, or turn off the display 104.

As generally described, the systems and methods provided herein are directed to content, such as graphical representations, displayed on a vehicle HUD or an AR-HUD. Based on the detection of a collision or a non-optimal route, the assistance system 102 may inform or alert the occupant that the current trajectory or projected path of the vehicle 100 is not ideal. The indicators may be augmented reality indicators on the display 104 to provide such information or an alert. Alerts with or without the indicators may also be displayed to provide such an alert. The assistance system 102 may make predictions as to the projected path of travel of vehicle 100. Based on these predictions, or actually approaching an object deemed an obstacle, the assistance system 102 displays notifications. The notifications may include the indicators, such as augmented reality indicators, or alerts. Furthermore, the indicators and/or alerts may provide colors or guidance based on directing the occupant to an optimal path, such as the guided path, to avoid a collision. The use of a windshield HUD or AR-HUD offers the advantage of allowing information to be displayed to the occupant's FOV for receiving guidance information while keeping eyes on the road. The processor 204 uses the sensor information and the angle of the steering wheel 114 to determine or calculate the car trajectory and the information to steer away from nearby obstacles, such as gates, walls, adjacent cars, is transmitted to the occupant on the display 104.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for providing forward maneuvering information of a vehicle, comprising:
   a microprocessor, the microprocessor being configured to execute instructions stored on a non-transitory computer readable medium;
   a sensor coupled to the microprocessor and configured to receive information of surroundings of the vehicle;
   a monitoring sensor coupled to the microprocessor and configured to determine an angle of a steering wheel; and
   a head-up display (HUD) coupled to the microprocessor;
   wherein the microprocessor is further configured to:
      receive the information and the angle;
      determine a guided path for the vehicle based on the information and the angle; and
      transmit the guided path to the HUD, wherein
   the guided path is configured to avoid a plurality of obstacles while all of the vehicle passes between two of the plurality of obstacles,
   a left obstacle of the two obstacles is defined as one of the plurality of obstacles closest to a left side of a projected path of the vehicle,
   a right obstacle of the two obstacles is defined as one of the plurality of obstacles closest to a right side of the projected path of the vehicle,
   a line between the two obstacles is approximately perpendicular to a center line of a road on which the vehicle is traveling, the guided path simultaneously shows a left indicator corresponding to the left obstacle and a right indicator corresponding to the right obstacle, and the guided path shows an alert on the left indicator while the vehicle is close to contacting the left obstacle and on the right indicator while the vehicle is close to contacting the right obstacle.

2. The system of claim 1, wherein the information includes a single obstacle proximate to the projected path of the vehicle.

3. The system of claim 2, wherein the microprocessor is further configured to generate an indication signal to the HUD representing the single obstacle.

4. The system of claim 2, wherein the microprocessor is further configured to transmit an alert signal to the HUD, the alert signal being defined as instructions to steer the vehicle away from the single obstacle.

5. The system of claim 1, wherein the HUD is further defined as an augmented reality head-up display (AR-HUD).

6. The system of claim 1, wherein the HUD is located in the field of view of an occupant of the vehicle.

7. The system of claim 1, wherein the HUD is located on a windshield of the vehicle.

8. A method for providing forward maneuvering information of a vehicle, comprising:

receiving, at a sensor, information of surroundings proximate to a projected path of the vehicle;

determining, by a monitoring sensor, an angle of a steering wheel;

processing, by a microprocessor, the information of surroundings and the angle to determine a guided path for the vehicle; and transmitting, by the microprocessor, the guided path for the vehicle to a display, wherein the guided path is configured to avoid a plurality of obstacles while all of the vehicle passes between two of the plurality of obstacles, a left obstacle of the two obstacles is defined as one of the plurality of obstacles closest to a left side of a projected path of the vehicle, a right obstacle of the two obstacles is defined as one of the plurality of obstacles closest to a right side of the projected path of the vehicle, a line between the two obstacles is approximately perpendicular to a center line of a road on which the vehicle is traveling, the guided path simultaneously shows a left indicator corresponding to the left obstacle and a right indicator corresponding to the right obstacle, and the guided path shows an alert on the left indicator while the vehicle is close to contacting the left obstacle and on the right indicator while the vehicle is close to contacting the right obstacle.

9. The method of claim 8, further comprising displaying an indicator representing a single obstacle proximate to the projected path of the vehicle.

10. The method of claim 9, wherein the displaying of the indicator further comprises changing at least one of intensity, brightness, color, shape, size, orientation, or visibility as the vehicle approaches the single obstacle.

11. The method of claim 8, further comprising providing an alert notification signal while the single obstacle is within the projected path of the vehicle.

12. The method of claim 11, further comprising displaying an alert on an AR-HUD in response to the alert notification signal.

13. The method of claim 8, further comprising transmitting information of surroundings proximate to the projected path of the vehicle to the display.

14. The method of claim 13, wherein the displaying of the guided path further comprises displaying the guided path within a field of view (FOV) of an occupant of the vehicle.

15. The method of claim 13, wherein displaying the guided path of the vehicle and the vehicle surroundings is on a windshield of the vehicle.

16. An assistance system of a vehicle, comprising:

a display;

a non-transitory computer readable medium to store instructions of the assistance system; and a processor configured to execute the instructions, the processor being configured to:

determine a position of the vehicle relative to surroundings of the vehicle in response to surrounding information received by a sensor;

determine an angle of a steering wheel in response to angle information determined by a monitoring sensor;

determine a path for the vehicle; and transmit the path to the display, wherein the path is configured to avoid a plurality of obstacles while all of the vehicle passes between at least two of the plurality of obstacles, a left obstacle of the two obstacles is defined as one of the plurality of obstacles closest to a left side of a projected path of the vehicle, a right obstacle of the two obstacles is defined as one of the plurality of obstacles closest to a right side of the projected path of the vehicle, a line between the two obstacles is approximately perpendicular to a center line of a road on which the vehicle is traveling, the path simultaneously shows a left indicator corresponding to the left obstacle and a right indicator corresponding to the right obstacle, and the path shows an alert on the left indicator while the vehicle is close to contacting the left obstacle and on the right indicator while the vehicle is close to contacting the right obstacle.

17. The system of claim 16, wherein the processor further is configured to transmit an alert signal to the display in response to the path and a single obstacle of the surroundings overlapping the projected path of the vehicle, and the display is further configured to display an alert in response to the alert signal.

18. The system of claim 17, wherein the alert is an arrow representing the direction to adjust the vehicle to avoid the single obstacle.

19. The system of claim 17, wherein the alert changes at least one of intensity, brightness, color, shape, size, orientation, or visibility as the vehicle is approaching the single obstacle.

20. The system of claim 17, wherein the alert is transmitted within a FOV of an occupant of the vehicle.

* * * * *